(29.)
WILLIAM A. CLARK.
Improvement in Expansive Bits.
No. 4,668. Reissued Dec. 12, 1871.
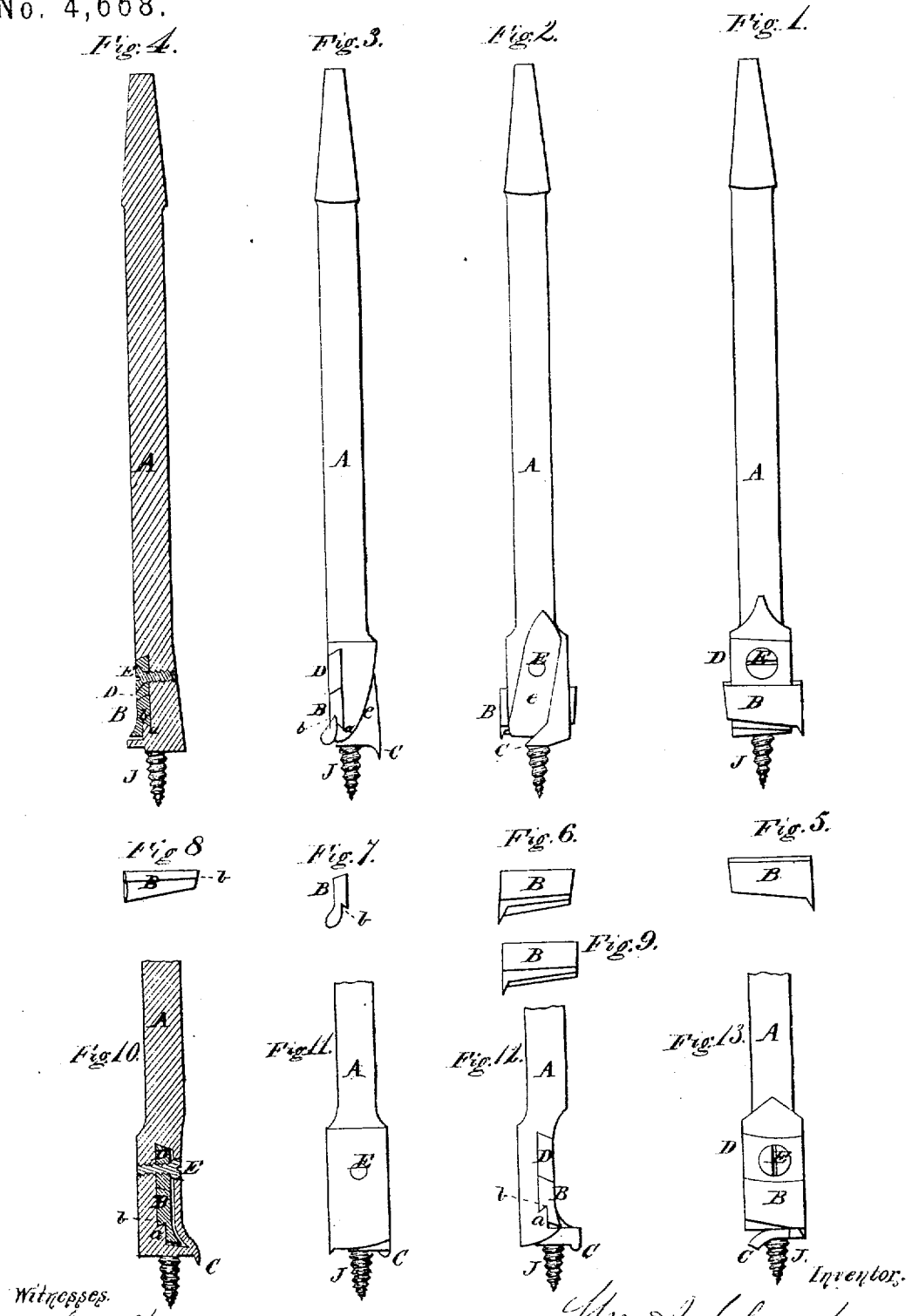
Witnesses.
Harry King.
Phil T. Dodge.
Inventor.
Wm A. Clark.
by Dodge & Munn.
Attys.
AM. PHOTO-LITHOGRAPHIC CO. N.Y. (OSBORNE'S PROCESS.)

UNITED STATES PATENT OFFICE.

WILLIAM A. CLARK, OF NEW HAVEN, CONNECTICUT.

IMPROVEMENT IN EXPANSIVE BITS.

Specification forming part of Letters Patent No. 20,192, dated May 11, 1858; reissue No. 3,516, dated June 22, 1869; reissue No. 3,733, dated November 16, 1869; reissue No. 4,668, dated December 12, 1871.

*To all whom it may concern:*

Be it known that I, WILLIAM A. CLARK, of New Haven, in the county of New Haven and State of Connecticut, have invented certain new and useful Improvements in Expansive Bits; and I do hereby declare that the following is a full, clear, and exact description thereof, reference being had to the accompanying drawing making part of this specification, and to the letters of reference marked thereon, like letters indicating like parts wherever they occur.

To enable others skilled in the art to construct and use my invention, I will proceed to describe it.

Figure 1 is a side view of an expansive bit embodying a portion of my improvements; Fig. 2, an opposite side view; Fig. 3, an elevation, its plane of projection being transverse of Figs. 1 and 2; Fig. 4, a sectional elevation, its plane of projection being parallel to that in Fig. 3, but transverse to that in Figs. 1 and 2; Fig. 5, a side elevation of the movable cutter; Fig. 6, a reverse view of it; Fig. 7, an end elevation; Fig. 8, an inverted plan, or, in other words, an under-side view; Fig. 9, a back-side elevation of a cutter so made as to keep always the movable cutter at just the same distance behind the point of the bit, while at the same time the depth of wood left to support the central portion of the bit is varied by the adjustment of said cutter; Fig. 10, a side elevation of a bit which, while embodying the same novel features as represented in the previous figures, is also so formed as to throw the chips in front of the movable cutter, which arrangement avoids the necessity of filing away the back side of the bit to allow the chips to pass; Fig. 11, an elevation transverse to Fig. 10; Fig. 12, a back-side elevation of same bit; and in Fig. 13, a vertical section, showing the same movable cutter secured in the same way in a mortise instead of a recess in the body of the bit.

This invention relates to an improvement in what are known as expansive bits—that is, bits constructed with an adjustment—whereby the cutter can be extended or contracted so as to cut a larger or smaller hole, as the case may be; and the invention may be stated, in general, to consist of an expansive bit composed of a recessed shank, into which the adjustable or expanding cutter is fitted, and in which it is adjusted and held, substantially as hereinafter described.

To enable others to fully understand my invention, I will proceed to describe the same as illustrated in the accompanying drawing.

A is the shank of the bit, upon which the inner or stationary cutter is formed, and in which the recess or mortise is made which receives the movable cutter B. The construction of the main portion of the shank, and of the cutting-tip permanently attached to it, is very much the same as other expansive bits, but the mode of securing the movable cutter in its place is different. In order to provide for the securing of the movable cutter B, I form an open recess in my bit, from the bottom of which rises a V-shaped ledge, *a*, so as to receive the V-shaped groove *b* in the said movable cutter. The form of the ledge *a* and that of the groove *b* is also shown in Figs. 3, 4, 11, and 13. The form of the groove is also shown in Fig. 7. The form of the groove *b* and the ledge upon which it rests is such as to give a firm bearing to the cutter B and draw it snugly against the back of the recess when pressure is applied, which secures the said cutter in place. The cutter, when thus dovetailed into the shank at its lower end, is secured in place with great ease, and without danger of injuring its cutting-edge, which is entirely relieved from any injurious pressure and contact with the shank by reason of the dovetailed connection between the shank and the lower end of the cutter, this connection also serving to bind that end of the cutter most firmly and tightly to the shank. In order to secure the cutter I employ a beveled plate or follower, D, driven home by a screw, E, in such manner as to press the cutter B against the back side and bottom of the recess in which it is secured, the said cutter being also beveled, as shown, to facilitate the accomplishment of this purpose. The form and arrangements of these parts are shown in Figs. 1, 3, 4, 10, 11, and 13. In the first four figures the relative positions of the cutters are such as to deliver the chips from the stationary cutter C upon the back side of that part of the stock which supports the movable cutter, and this involves the necessity of cutting away the stock, as shown at *e* in Figs. 2 and 3, to allow the chips to pass. This, of course, weakens that part of the stock, and makes it necessary to secure sufficient strength by retaining more metal on the side upon which the cutter B is attached, and, as a consequence, the edge of this cutter is thrown out too far from the center of the stock, and its efficiency of operation in different positions is thereby reduced. To obviate this difficulty I form the stationary lip C in that position upon the stock in which it is represented in Figs. 10, 11, 12, and 13, by which arrangement the chips from it are delivered upon that side of the stock which is cut away to receive the cutter B, which allows the opposite side to be left entire, and also so balances the operating parts as to relieve the screw J from a portion of the pressure which would otherwise be thrown upon it when in operation. This arrangement enables me to bring the edge of the cutter B nearly back to the center of the stock, as shown in Fig. 11, and in large bits it may be brought further back than it is there represented as being placed. It may be, in some cases, considered desirable, in the construction of very large bits, to leave a portion of metal in front of the cutter B, as shown in Fig. 13, for the more effectual support of that side of the bit. In this case the screw E should extend through this part, as shown.

The mode which I have above described of supporting and securing the cutter B supports it without its resting on the cutting-edge, as shown; and by thus supporting it the edge of a large cutter may be set higher in the stock than it is necessary or best to set the edge of a small one, which allows more wood to be left near the stock to support it, where a large cutter is used. The cutting-edge of the cutter B is inclined so as to bring its working end lower than the other, for the twofold purpose of causing the unemployed end to clear the wood, and of leaving a portion of the wood around the central portion of the bit to support it, while at the same time the outer end of the cutter B shall cut nearly or quite as far in advance as the inner cutter. The seat upon which the movable cutter rests at the bottom has, in most expansive bits, an inclination corresponding with that of the edge of the said cutter, and this feature is retained in my bit, as represented in all the figures except Fig. 9. When so constructed the sliding of the movable cutter outward also carries its working end downward, so that when placed in its extreme outward position it will cut considerably deeper than when withdrawn, so as to cut its minimum hole. It is desirable, however, that the depth it will cut shall be as nearly equal as possible; and further, it becomes necessary, when the movable cutter is required to cut away a large amount of wood, to preserve a considerable shoulder of the wood adjacent to the stock for its support against the strain imposed upon it by the resistance against the movable cutter. For this purpose I make my longer cutters so that the edge shall stand a little higher in the stock than the edges of those which are intended to cut a smaller hole, which my mode of supporting the cutters upon a ledge or shoulder, placed above the edge, enables me to do; and this provision for giving the proper shoulder and depth of cut answers very satisfactorily for most purposes. Should greater nicety in these be desirable, it may be attained by the adoption of the cutter shown in Fig. 9 and the use of a horizontal V in the stock, as in this case the edge of the cutter is inclined with reference to the groove *b*, while in the cutters shown in the previous figures it is parallel to it. This arrangement causes the point of the movable cutter to always work at the same depth, and makes the depth of the shoulder in exact proportion to the distance at which the point of the cutter is from the center. I so construct and arrange the cutters in relation to each other that all the chips shall be delivered upon one and the same side of the shank, which enables me to leave the back side of the shank entire, and thus secure additional strength, and at the same time arrange the parts in position where they will operate more efficiently. To accomplish this purpose the cutter or (stationary) lip C is formed in position upon the shank in which it is represented in the drawing; or, in other words, in such a position that it will deliver its chips upon the side of the shank which is cut away to receive the cutter B, and upon which the cutter B delivers its chips, thus delivering all the chips on one side and allowing the other side to be left entire to give the necessary strength.

I do not claim a bit with two movable cutters, in front of one of which the stationary cutter delivers its chips. This is not new, and does not accomplish the object for which my invention is intended; but

Having thus described my invention, what I do claim is—

1. The arrangement of the stationary lip C and the adjustable lip B, substantially as described, whereby all the chips made by the instrument are delivered upon one and the same side of the shank, thereby allowing the back side of the shank of the bit to be left entire, as set forth.

2. The formation of a V-ledge, *a*, in the recessed shank, and a correspondingly-shaped recess in the adjustable cutter back of or above its cutting-edge to fit the ledge in the shank, substantially as and for the purpose set forth.

3. The combination, with the recessed shank and adjustable cutter, in which a V-ledge and a correspondingly-shaped recess are respectively formed, as specified, of the follower and screw for driving home the cutter against the V-ledge, which forms its lower bearing and binds it to the shank, substantially as shown and described.

WILLIAM A. CLARK.

Witnesses:
SUSAN B. MORRIS,
JESSIE A. CLARK.

(29)